(12) United States Patent
Tomioka

(10) Patent No.: US 11,163,526 B2
(45) Date of Patent: Nov. 2, 2021

(54) PRINTING SYSTEM CAPABLE OF TRANSMITTING AND EXECUTING PRINT DATA BY A VOICE INSTRUCTION, A CONTROL METHOD, AND A SERVER

(71) Applicant: CANON KABUSHIKI KAISHA, Tokyo (JP)

(72) Inventor: Yu Tomioka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/069,030

(22) Filed: Oct. 13, 2020

(65) Prior Publication Data

US 2021/0026596 A1    Jan. 28, 2021

Related U.S. Application Data

(63) Continuation of application No. 16/440,358, filed on Jun. 13, 2019, now Pat. No. 10,838,693.

(30) Foreign Application Priority Data

Jun. 15, 2018    (JP) .............................. JP2018-114690

(51) Int. Cl.
*G06F 3/12*    (2006.01)
*G06F 3/16*    (2006.01)
(52) U.S. Cl.
CPC ............ *G06F 3/167* (2013.01); *G06F 3/1204* (2013.01); *G06F 3/1207* (2013.01); *G06F 3/1254* (2013.01); *G06F 3/1288* (2013.01)
(58) Field of Classification Search
None
See application file for complete search history.

(56) References Cited

U.S. PATENT DOCUMENTS 6,243,682 B1 * 6/2001 Eghtesadi .......... G03G 15/5016
704/270
10,972,632 B2 * 4/2021 Otake .................... H04N 1/442
(Continued)

FOREIGN PATENT DOCUMENTS

| EP | 2 958 007 A1 | 12/2015 |
| JP | 2015-100020 A | 5/2015 |
| WO | 2017039648 A1 | 3/2017 |

OTHER PUBLICATIONS

European Search Report dated Nov. 13, 2019, in related European Patent Application No. 19177044.5.
(Continued)

*Primary Examiner* — Henok Shiferaw
(74) *Attorney, Agent, or Firm* — Venable LLP

(57) ABSTRACT

A printing system includes a server system to receive instruction data based on a voice instruction accepted by a voice control device and transmit message data, and a printing apparatus that communicates with the server system. The voice control device outputs, in a case where the message data for narrowing down content to be printed is transmitted, a message by voice based on the transmitted message data and accepts a voice instruction related to a content of the first content type, the server system specifies content data of the first content type based on instruction data received in a case where the voice instruction related to the content of the first content type is accepted, and the printing apparatus executes printing based on print data generated based on the specified content data of the first content type.

34 Claims, 11 Drawing Sheets

(56) References Cited

U.S. PATENT DOCUMENTS

| | | | |
|---|---|---|---|
| 2003/0036909 A1* | 2/2003 | Kato | H04N 1/00416 704/275 |
| 2015/0085308 A1* | 3/2015 | Okabayashi | H04N 1/00392 358/1.13 |
| 2015/0261481 A1* | 9/2015 | Takenaka | H04N 1/0035 358/1.15 |
| 2016/0260432 A1 | 9/2016 | Buser et al. | |
| 2017/0301353 A1 | 10/2017 | Mozer et al. | |
| 2018/0288248 A1* | 10/2018 | Shen | H04N 1/00403 |
| 2019/0156825 A1 | 5/2019 | Shiga | |
| 2019/0349488 A1 | 11/2019 | Chitpasong | |

OTHER PUBLICATIONS

Sarah Murray, HP says hello to voice-activated printing, XP055639644, pp. 1-5 (Jan. 31, 2018).
HP Printer Skill for Microsoft Cortana, XP05563594, pp. 1-5 (Feb. 10, 2018).
HP Customer Support—Knowledge Base, XP055639607, pp. 1-10 (Oct. 4, 2017).
Indian Office Action dated Jun. 25, 2021, in related Indian Patent Application No. 201944023231.

* cited by examiner

FIG. 8

| PRINT TARGET | ADDITIONAL SETTING ITEM | SETTABLE VALUE |
|---|---|---|
| PUZZLE | DIFFICULTY LEVEL | EASY, NORMAL, HARD, RANDOM |
| COLORING PICTURE | TARGET GROUP | FOR ADULTS, FOR CHILDREN |
| WRITING PAPER | — | — |
| STAFF NOTATION | — | — |
| CHECK LIST | — | — |

801 802 803

F I G. 9

| PRINT TARGET 901 | ADDITIONAL SETTING ITEM 1 902 | SETTABLE VALUE 1 903 | ADDITIONAL SETTING ITEM 2 904 | SETTABLE VALUE 2 905 |
|---|---|---|---|---|
| PUZZLE | TYPE | NUMBER PLACE | DIFFICULTY LEVEL | EASY, NORMAL, HARD, RANDOM |
|  |  | CROSSWORD | GENRE | ECONOMY, CULTURE, ENTERTAINMENT |
| COLORING PICTURE | CATEGORY | ANIMAL | TARGET GROUP | FOR ADULTS, FOR CHILDREN |
|  |  | FLOWER | TARGET GROUP | FOR ADULTS, FOR CHILDREN |
|  |  | ANIMATION | — | — |
| WRITING PAPER | — | — | — | — |
| STAFF NOTATION | — | — | — | — |
| CHECK LIST | — | — | — | — |

PRINTING SYSTEM CAPABLE OF TRANSMITTING AND EXECUTING PRINT DATA BY A VOICE INSTRUCTION, A CONTROL METHOD, AND A SERVER

This application is a continuation of application Ser. No. 16/440,358, filed Jun. 13, 2019

BACKGROUND OF THE INVENTION

Field of the Invention

The present invention relates to a printing system capable of executing printing by a voice instruction, a control method, and a server.

Description of the Related Art

There is known a technique in which a mobile terminal communicably connected to a printing apparatus causes the printing apparatus to execute printing. According to Japanese Patent Laid-Open No. 2015-100020, when a printer application program is executed in a mobile terminal and a print button is pressed on a UI screen displayed on the mobile terminal, printing is instructed.

In Japanese Patent Laid-Open No. 2015-100020, however, a user needs to press the print button in order to instruct printing. In recent years, a printing apparatus has been used in various scenes, and thus a technique of further improving the operability of a print instruction has been required.

SUMMARY OF THE INVENTION

An aspect of the present invention is to eliminate the above-mentioned problems with the conventional technology. The present invention provides a printing system that further improves the operability of a print instruction, a control method, and a server.

The present invention in its first aspect provides a printing system comprising at least one server and a printing apparatus, the at least one server including a reception unit configured to receive instruction data based on a voice instruction concerning printing accepted by a voice control device, a transmission unit configured to transmit message data based on the received instruction data, and a specifying unit configured to specify content data, wherein if print target content data cannot be specified based on the instruction data, the transmission unit transmits message data to inquire about a content setting item, and if the print target content data can be specified based on the instruction data, the transmission unit transmits message data to inquire about a print setting item, the voice control device outputs a message by voice based on the transmitted message data, the specifying unit specifies the content data based on a voice instruction accepted by the voice control device after the message is output by voice, and the printing apparatus executes printing based on print data generated based on the specified content data.

The present invention in its second aspect provides a control method in a printing system including at least one server and a printing apparatus, comprising: by the at least one server, receiving instruction data based on a voice instruction concerning printing accepted by a voice control device; transmitting message data based on the received instruction data; and specifying content data, wherein if print target content data cannot be specified based on the instruction data, message data to inquire about a content setting item is transmitted, and if the print target content data can be specified based on the instruction data, message data to inquire about a print setting item is transmitted, the voice control device outputs a message by voice based on the transmitted message data, the content data is specified based on a voice instruction accepted by the voice control device after the message is output by voice, and the printing apparatus executes printing based on print data generated based on the specified content data.

The present invention in its third aspect provides a server comprising: a reception unit configured to receive instruction data based on a voice instruction concerning printing accepted by a voice control device; a transmission unit configured to transmit message data based on the received instruction data; and a specifying unit configured to specify content data, wherein if print target content data cannot be specified based on the instruction data, the transmission unit transmits message data to inquire about a content setting item, and if the print target content data can be specified based on the instruction data, the transmission unit transmits message data to inquire about a print setting item, the voice control device outputs a message by voice based on the transmitted message data, and the specifying unit specifies the print target content data based on a voice instruction accepted by the voice control device after the message is output by voice.

According to the present invention, it is possible to further improve the operability of a print instruction.

Further features of the present invention will become apparent from the following description of exemplary embodiments with reference to the attached drawings.

BRIEF DESCRIPTION OF THE DRAWINGS

FIG. 8 is a table in which a print target and a setting item are associated with each other;

FIG. 9 is a table in which a print target and setting items are associated with each other;

DESCRIPTION OF THE EMBODIMENTS

Figure 1:
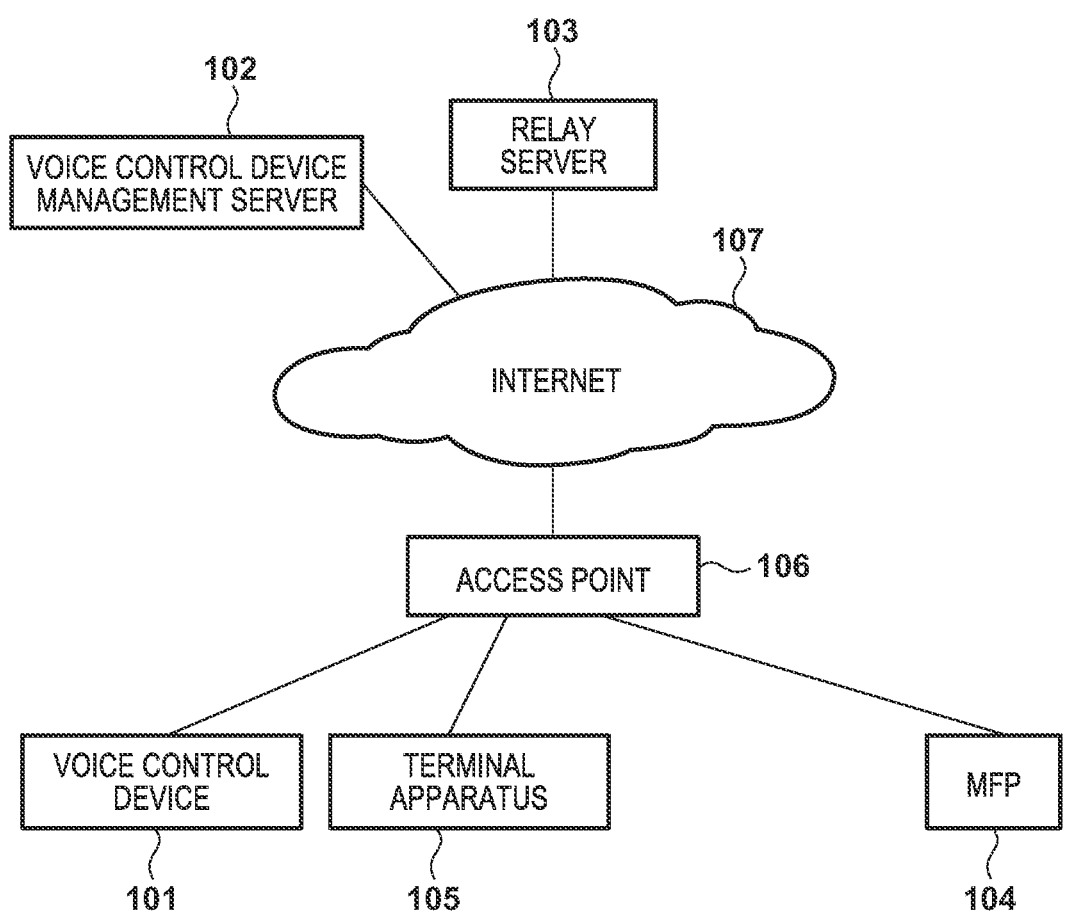
FIG. 1 is a view showing the configuration of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

FIG. 1 is a view showing an example of the configuration of a printing system according to this embodiment. The printing system shown in FIG. 1 includes a voice control device 101, a voice control device management server 102, a relay server 103, an MFP 104, a terminal apparatus 105, and an access point (AP) 106. The MFP 104 is an example of a printing apparatus having a printing function, and will be explained as a Multi Function Printer in this embodiment. The terminal apparatus 105 is an arbitrary terminal apparatus such as a smartphone, a PC (Personal Computer), a tablet terminal, a mobile phone, or a PDA (Personal Digital Assistant). Note that the terminal apparatus 105 is a smartphone in the following description. The AP 106 is, for example, a wireless LAN router, and an apparatus connected to the AP 106 can use the Internet via the AP 106. Furthermore, in this embodiment, the voice control device 101, the MFP 104, and the terminal apparatus 105 are wirelessly connected to the AP 106 in accordance with the wireless communication method of a wireless LAN complying with the IEEE 802.11 standard series. That is, the voice control device 101, the MFP 104, and the terminal apparatus 105 are connected to a local network formed by the AP 106.

In the printing system, the user can instruct printing by voice. The voice control device 101 is, for example, a device called a smart speaker or AI speaker. More specifically, the voice control device 101 can perform voice recognition of a voice of the user input to the microphone, and transmit the voice data via the network formed by the AP 106 and the Internet 107, and can also output, by the loudspeaker, voice data received via the Internet 107 and the network formed by the AP 106. The voice control device 101 and the terminal apparatus 105 can communicate with the voice control device management server 102 via the AP 106 and the Internet 107. The voice control device management server 102 manages the voice control device 101, and associates, for example, the voice control device 101 and the MFP 104 with each other. In addition, for example, the voice control device management server 102 performs predetermined processing (to be described later) in accordance with contents of the voice data received from the voice control device 101.

The voice control device management server 102 and the relay server 103 are interconnected via the Internet 107. The relay server 103 controls the MFP 104 to, for example, generate print data in accordance with a request from the voice control device management server 102 and transmit the print data to the MFP 104. Furthermore, the relay server 103 and the MFP 104 are interconnected via the network formed by the AP 106 and the Internet 107, and the relay server 103 instructs, via the Internet 107 and the network formed by the AP 106, the MFP 104 to execute printing. Note that in the system shown in FIG. 1, the voice control device 101, the MFP 104, and the terminal apparatus 105 are connected to the same AP to be able to use the Internet 107. The present invention, however, is not limited to this. For example, the voice control device 101, the MFP 104, and the terminal apparatus 105 may be connected to different APs to be able to use the Internet. Alternatively, these apparatuses may be able to use the Internet by a mobile communication network such as LTE or 4G without using any AP.

Figure 2:
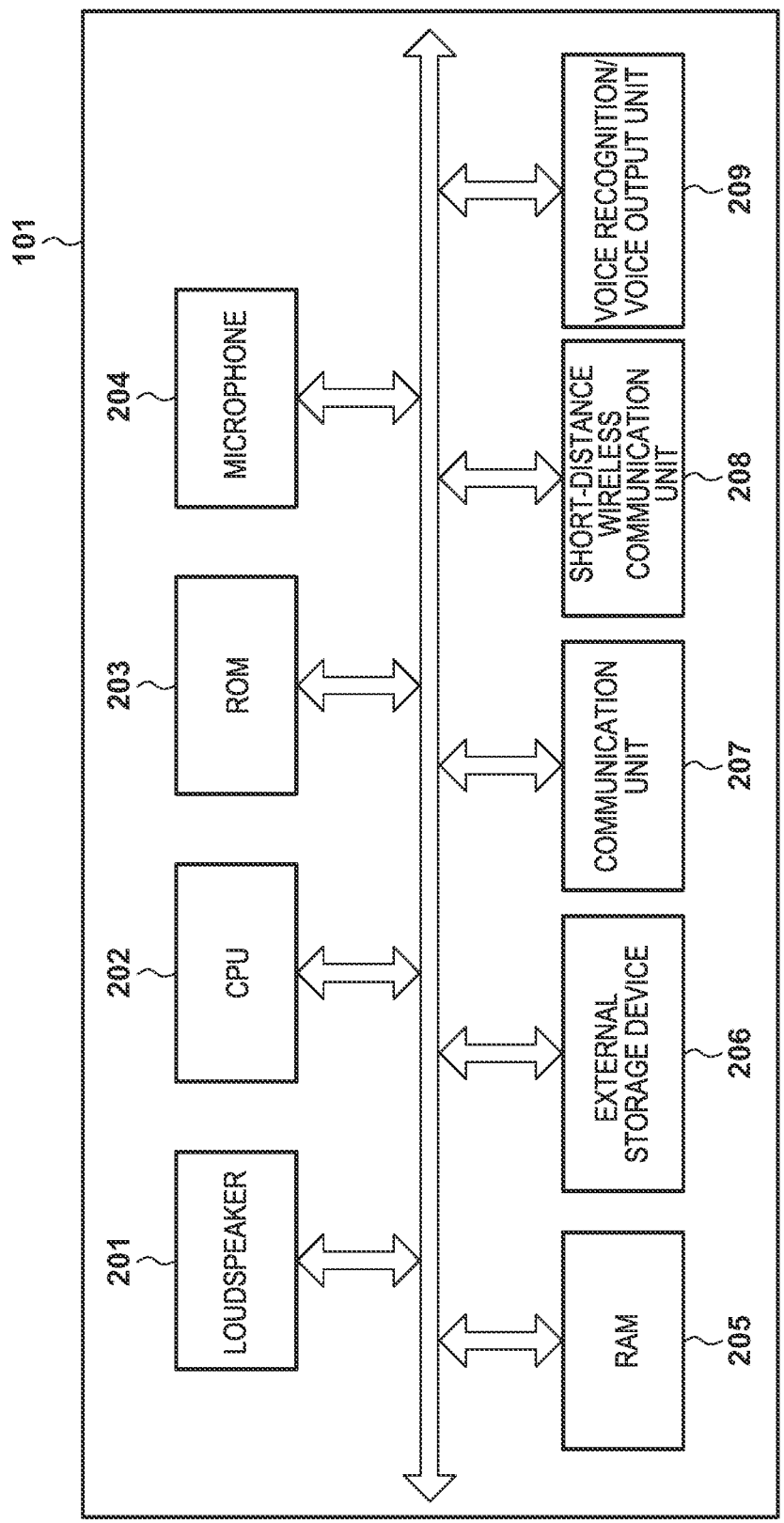
FIG. 2 is a block diagram showing the block arrangement of a voice control device.

FIG. 2 is a block diagram showing the hardware block arrangement of the voice control device 101. The voice control device 101 includes a loudspeaker 201, a CPU 202, a ROM 203, a microphone 204, a RAM 205, an external storage device 206, a communication unit 207, and a short-distance wireless communication unit 208. Note that respective blocks shown in FIG. 2 are interconnected using, for example, an internal bus. Note also that CPU is an acronym for Central Processing Unit, ROM is an acronym for Read Only Memory, and RAM is an acronym for Random Access Memory. In this embodiment, the operation of the voice control device 101 is implemented when, for example, the CPU 202 loads a program stored in the ROM 203 into the RAM 205, and executes it.

The loudspeaker 201 outputs a voice based on voice data. The CPU 202 is provided on, for example, a system control board, and comprehensively controls the voice control device 101. The ROM 203 stores fixed data such as control programs to be executed by the CPU 202, data tables, and an embedded OS (Operating System) program. In this embodiment, each control program stored in the ROM 203 is a target of software execution control of the embedded OS stored in the ROM 203. Software execution control is, for example, scheduling, task switch, or interrupt processing. The microphone 204 receives a voice on the periphery of the voice control device 101, for example, a voice uttered by the user.

The RAM 205 is formed by, for example, an SRAM (Static RAM) or the like that needs a backup power supply. Note that the RAM 205 holds data by a primary battery (not shown) for data backup and can therefore hold data such as a program control variable without volatilizing it. In addition, a memory area to store the setting information and management data of the voice control device 101 is also provided in the RAM 205. The RAM 205 is also used as the main memory and the work memory of the CPU 202. The external storage device 206 stores application software.

The communication unit 207 includes a circuit and an antenna for performing communication in accordance with a predetermined wireless communication method. For example, the communication unit 207 can wirelessly be connected to the external access point 106. In addition, the communication unit 207 can temporarily operate as an access point. That is, the communication unit 207 can have an access point function. The wireless communication used in this embodiment may have a capability of operating in accordance with the wireless communication method of a wireless LAN complying with the IEEE 802.11 standard series or may have a capability of operating in accordance with another wireless communication method. The short-distance wireless communication unit 208 executes short-distance wireless communication with another apparatus existing within a predetermined short-distance range from the voice control device 101. Note that the short-distance wireless communication unit 208 performs communication using a wireless communication method different from that of the communication unit 207. In this embodiment, the short-distance wireless communication unit 208 operates in accordance with the Bluetooth® standard.

A voice recognition/voice output unit 209 performs voice recognition of a voice input via the microphone 204 to generate voice data, and also converts externally received voice data or message data held in advance into a voice signal to output a voice from the loudspeaker 201.

Figure 3:
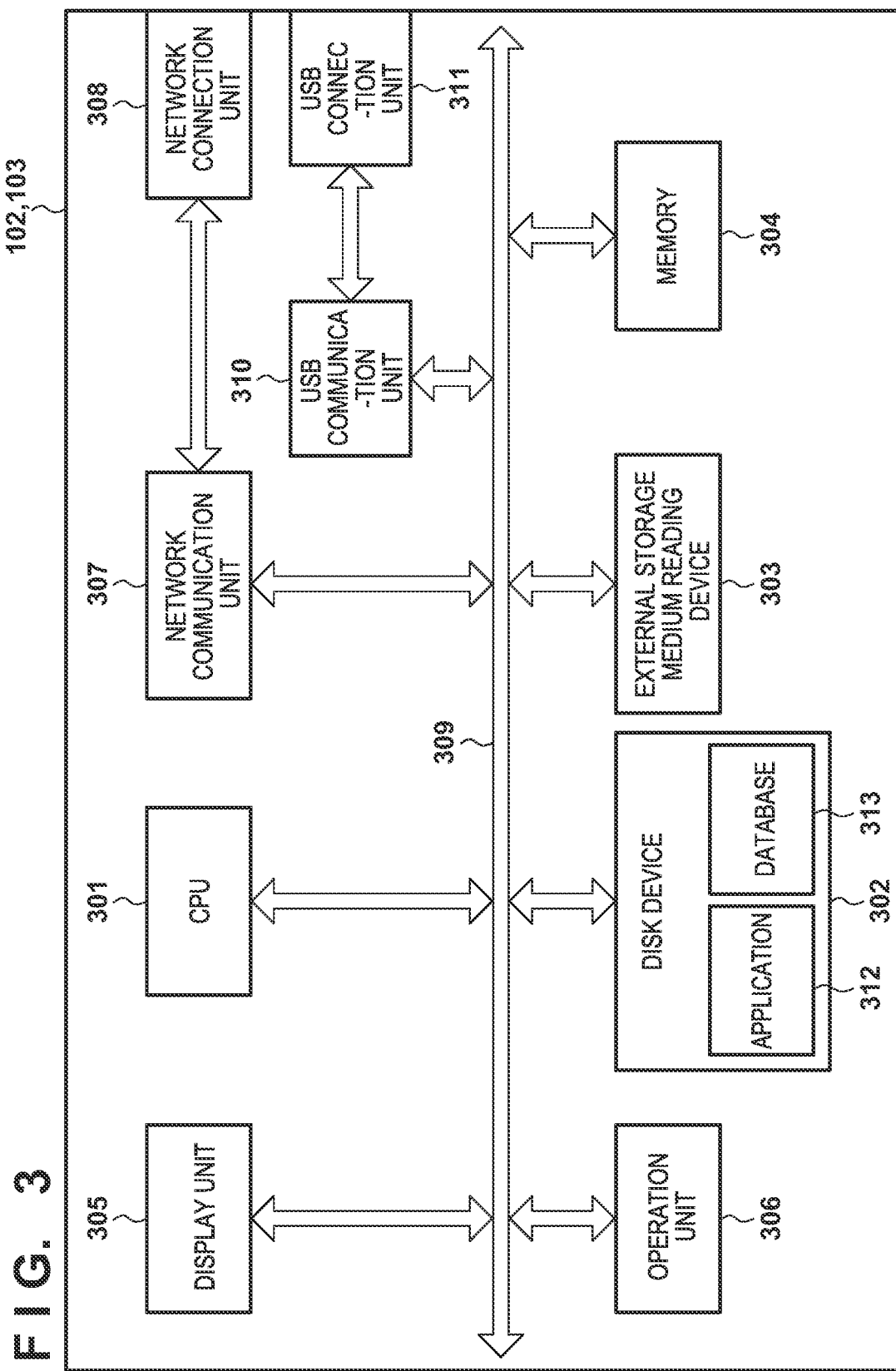
FIG. 3 is a block diagram showing the block arrangement of each of a voice control device management server and a relay server.

FIG. 3 is a block diagram showing the block arrangement of each of the voice control device management server 102 and the relay server 103. FIG. 3 shows the arrangement common to the above two apparatuses, and thus the voice control device management server 102 will be described below. Note that in this embodiment, each of the voice control device management server 102 and the relay server 103 is formed by one server (information processing apparatus). However, when a plurality of servers operate in cooperation with each other, a server system corresponding to the voice control device management server 102 or the relay server 103 may be formed.

A CPU 301 is a central processing unit for comprehensively controlling the voice control device management server 102. A disk device 302 stores an application program 312, a database 313, and an OS, as well as various files and data. An external storage medium reading device 303 is a device for reading information such as a file stored in an external storage medium such as an SD card. A memory 304 is formed by a RAM or the like, and the CPU 301 temporarily stores or buffers data in the memory 304, as needed.

A display unit 305 is formed by, for example, an LCD, and displays various kinds of information. Furthermore, an operation unit 306 includes a keyboard and a mouse used by the user to perform various input operations, and can accept instructions and operations from the user. A network communication unit 307 is connected to a network such as the Internet via a network connection unit 308 to perform various communications. The network connection unit 308 supports a network medium such as a wired LAN or a wireless LAN. For the wired LAN, the network connection unit 308 is, for example, a connector for connecting a wired LAN cable. For the wireless LAN, the network connection unit 308 is, for example, an antenna. Note that the network connection unit 308 may support both the wired LAN and the wireless LAN. A USB communication unit 310 is connected to various peripheral devices via a USB connection unit 311 to perform various communications.

Respective blocks shown in FIG. 3 are interconnected via a bus 309. In this embodiment, the operation of the voice control device management server 102 (or the relay server 103) is implemented when, for example, the CPU 301 loads a program necessary for processing from the disk device 302 into the memory 304 and executes the program. The voice recognition function of the voice recognition/voice output unit 209 shown in FIG. 2 may be included in the arrangement of FIG. 3. In this case, the apparatus including the arrangement of FIG. 3 can, for example, perform voice recognition of a voice signal transmitted from the voice control device 101, recognize a predetermined word, and extract it. Although this embodiment describes the voice control device management server 102 and the relay server 103 as separate servers (information processing apparatuses), these servers may be formed by a server that integrates both the server functions.

Figure 4:
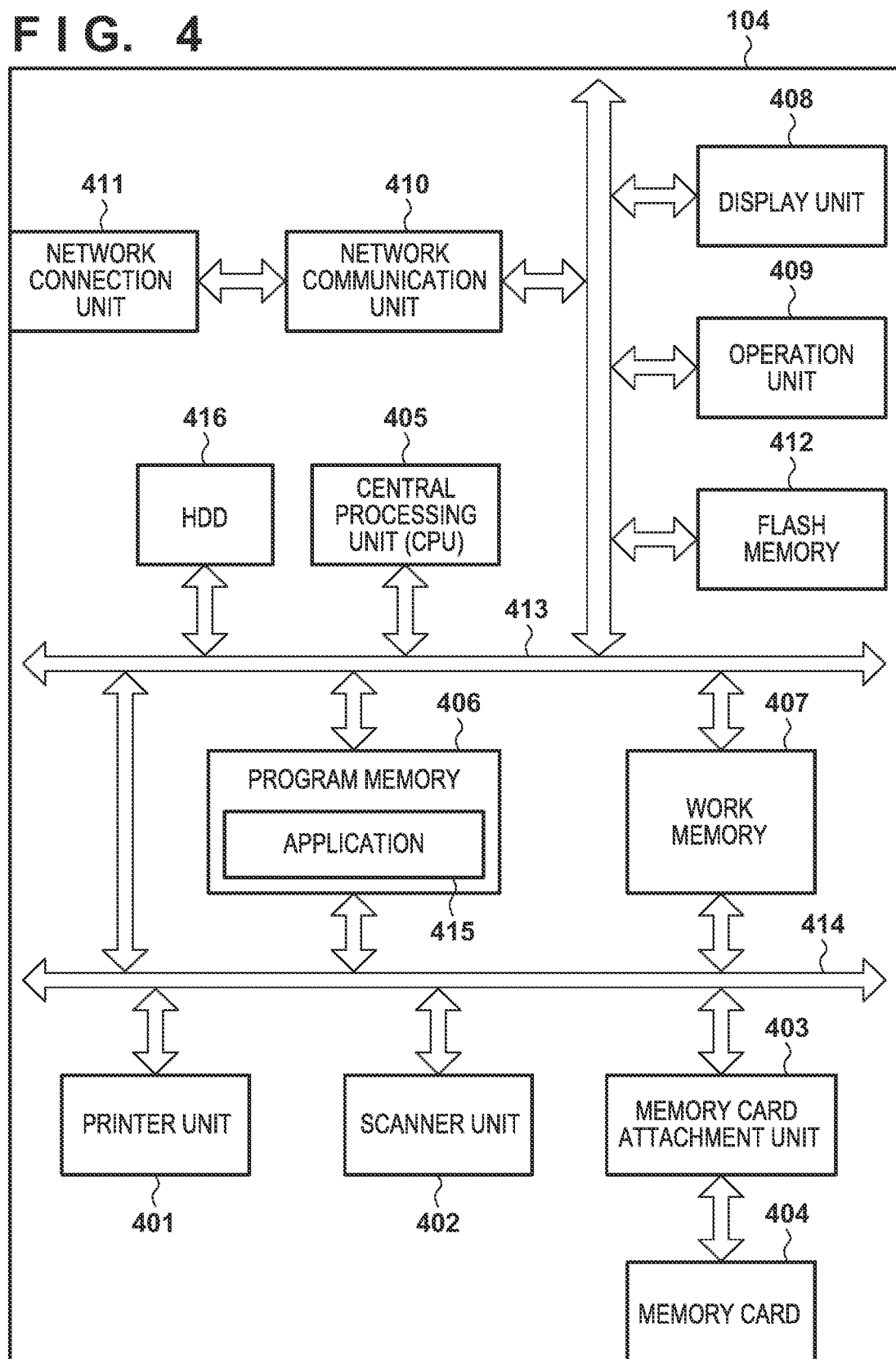
FIG. 4 is a block diagram showing the block arrangement of an MFP.

FIG. 4 is a block diagram showing the block arrangement of the MFP 104. Note that this embodiment will explain a multi function printer as an example of the MFP 104. Instead of the form of the multi function printer, an apparatus of another form may be used as long as the apparatus has the printing function. For example, an image processing apparatus, a copy machine, a facsimile, a printing apparatus having a single function, or the like may be used. In the MFP 104, the printing function is implemented by a printer unit 401, a scanner function is implemented by a scanner unit 402, and a storage function is implemented by a memory card attachment unit 403 and a memory card 404. The above-described units are interconnected by a bus 414.

The printer unit 401 prints externally received image data, image data stored in the memory card 404, or the like on a print medium such as a print sheet by a printing method such as an inkjet printing method or an electrophotographic method. In addition, the printer unit 401 manages information concerning consumable members, for example, ink information including the remaining amount of ink, and sheet information concerning the number of stacked sheets and the like.

The scanner unit 402 optically reads an original set on an original table (not shown), converts it into electronic data, and transmits image data converted into a designated file format to an external apparatus via a network or stores the image data in the memory area of an HDD 416 or the like. A copy service is implemented when image data generated by reading, by the scanner unit 402, an original placed on the original table is transferred to the printer unit 401, and the printer unit 401 executes printing on a print medium such as a print sheet based on the image data.

The memory card 404 attached to the memory card attachment unit 403 stores various file data. The file data may be read out from an external apparatus via the network and edited. Furthermore, the file data may be stored from an external apparatus in the memory card 404.

In addition, the MFP 104 includes a CPU 405, a program memory 406, a work memory 407, a display unit 408, an operation unit 409, a network communication unit 410, a network connection unit 411, and a flash memory 412. The CPU 405 is a central processing unit for comprehensively controlling the respective units in the MFP 104. The program memory 406 is formed by a ROM or the like, and stores various program codes and an application 415 for communicating with an external server. The application 415 can access the printer unit 401 to acquire consumable information concerning ink, a sheet, and the like. The work memory 407 is formed by a RAM or the like, and temporarily stores or buffers image data and the like at the time of execution of each service. The display unit 408 is formed by, for example, an LCD, and displays various kinds of information such as a user interface screen. Furthermore, the operation unit 409 includes a keyboard, a mouse, and a switch, and can accept instructions and operations from the user. The network communication unit 410 connects the MFP 104 to a network via the network connection unit 411 to perform various communications.

If the network communication unit 410 supports the wired LAN, the network connection unit 411 is a connector for connecting a wired LAN cable. If the network communication unit 410 supports the wireless LAN, the network connection unit 411 serves as an antenna. Note that the network connection unit 411 may support both the wired LAN and the wireless LAN. In this embodiment, the network communication unit 410 and the network connection unit 411 support the wireless LAN, and are connected to the AP 106 in accordance with the wireless communication method of the wireless LAN complying with the IEEE 802.11 standard series. Note that the network connection unit 411 can temporarily operate as an access point. That is, the network connection unit 411 may have the access point function. The MFP 104 may include a short-distance wireless communication unit (not shown), similar to the voice control device 101.

The flash memory 412 is a nonvolatile memory for storing image data received by the network communication unit 410 and the like. The above-described units are interconnected by a bus 413. There may be a block that performs data conversion between the buses 414 and 413. In this embodiment, the operation of the MFP 104 is implemented when, for example, the CPU 405 reads out a program necessary for processing from the program memory 406 into the work memory 407, and executes the program.

Figure 11:
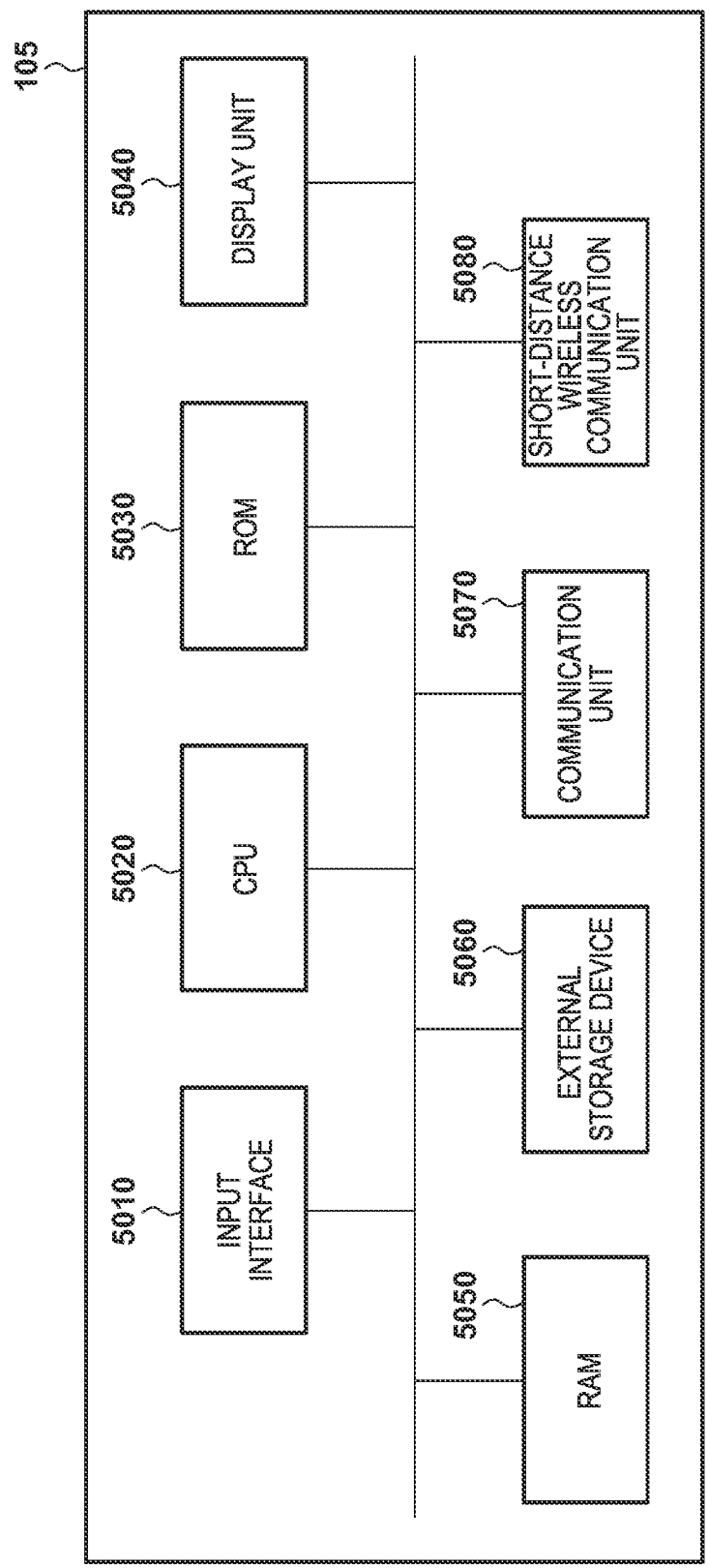
FIG. 11 is a block diagram showing the block arrangement of a terminal apparatus.

FIG. 11 is a block diagram schematically showing the hardware arrangement of the terminal apparatus 105. As an example, the terminal apparatus 105 includes an input interface 5010, a CPU 5020, a ROM 5030, a display unit 5040, a RAM 5050, an external storage device 5060, a communication unit 5070, and a short-distance wireless communication unit 5080. Note that these blocks are interconnected using, for example, an internal bus.

The CPU 5020 is a system control unit, and controls the overall apparatus. The RAM 5050 is formed by a DRAM (Dynamic RAM) or the like which needs a backup power supply, similar to, for example, the RAM 205. The RAM 5050 is also used as the main memory and the work memory of the CPU 5020. The ROM 5030 stores fixed data such as control programs to be executed by the CPU 5020, data tables, and an OS program. Note that in this embodiment, an application program (to be referred to as a voice control application hereinafter) for the voice control device 101 is installed in the terminal apparatus 105, and stored in the ROM 5030.

The display unit 5040 is formed by an LED (Light Emitting Diode), an LCD (Liquid Crystal Display), or the like, and displays a screen based on various data. Note that the display unit 5040 may be formed by a touch display or the like to have a function of accepting various input operations from the user. That is, the display unit 5040 serves as an interface for accepting a data input or an operation instruction from the user, and may be an operation panel formed by a physical keyboard and buttons, a touch panel, or the like. The communication unit 5070 has the same function as that of the above-described communication unit 207, and can wirelessly be connected to another apparatus via the AP 106. The short-distance wireless communication unit 5080 is a device that can perform short-distance wireless communication with the short-distance wireless communication unit 208 using the same wireless communication method as that used by the short-distance wireless communication unit 208.

Note that the arrangements shown in FIGS. 2, 3, 4, and 11 are merely examples, and each apparatus may include a hardware component except for those shown in FIG. 2, 3, 4, or 11. In each of FIGS. 2, 3, 4, and 11, a plurality of blocks may be integrated into one block, and one block may be divided into two or more blocks. That is, each of the apparatuses shown in FIGS. 2, 3, 4, and 11 may have another arrangement as long as it is possible to execute processing (to be described later) according to this embodiment.

Figure 5:
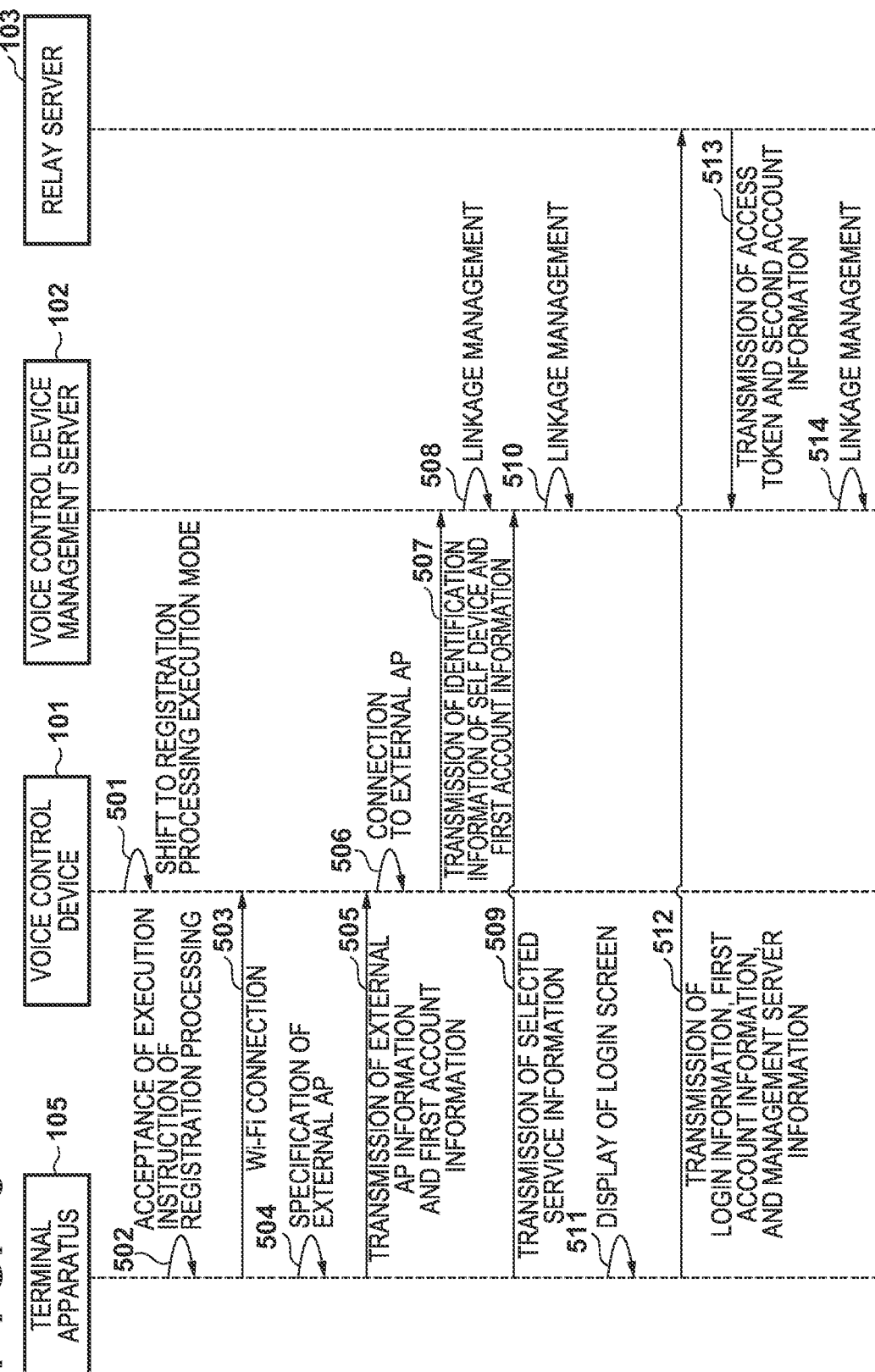
FIG. 5 is a sequence chart showing processing of associating the voice control device and the MFP with each other.

Registration processing of associating the voice control device 101 and the MFP 104 with each other in order for the user to use the service (the operation of this embodiment) of the printing system will be described next. FIG. 5 is a sequence chart showing the registration processing of associating the voice control device 101 and the MFP 104 with each other. Note that processing executed by each apparatus in this sequence is implemented when the CPU of each apparatus executes a program stored in the ROM or the like of each apparatus. Note that the program executed by the terminal apparatus 105 is the voice control application.

Before the registration processing is executed, the user logs in to a user account (to be referred to as the first account hereinafter) for the voice control device 101, which is managed by the voice control device management server 102, using the voice control application of the terminal apparatus 105. Thus, the voice control device management server 102 manages the terminal apparatus 105 and the first account in linkage with each other. Furthermore, the voice control device management server 102 recognizes information concerning the voice control application of the terminal apparatus 105 linked with the first account. The terminal apparatus 105 recognizes information (account name, ID, password, and the like) concerning the first account.

After that, in S501, the voice control device 101 accepts a predetermined operation from the user and shifts to a mode of executing the registration processing. More specifically, the voice control device 101 enables its access point.

In S502, the terminal apparatus 105 accepts an execution instruction of the registration processing from the user by an input to a screen displayed by the voice control application.

In S503, the terminal apparatus 105 is connected to the access point of the voice control device 101 by Wi-Fi.

In S504, the terminal apparatus 105 specifies an external access point that performs connection to the voice control device 101. More specifically, the terminal apparatus 105 searches for peripheral external access points, and displays a list of found external access points. The terminal apparatus 105 specifies an external access point selected from the list by the user. Note that a method of specifying the external access point is not limited to this. For example, the terminal apparatus 105 may receive, from the voice control device 101 via Wi-Fi connection, a list of external access points found by a search executed by the voice control device 101, and specify an external access point selected from the list by the user. Alternatively, for example, the terminal apparatus 105 may specify an external access point that is connected to the terminal apparatus 105 when accepting an execution instruction of the registration processing from the user.

In S505, the terminal apparatus 105 transmits, to the voice control device 101 via the Wi-Fi connection, information concerning the external access point specified in S504 and the above-described information concerning the first account. Note that after transmitting the information in S505, the terminal apparatus 105 may disconnect the Wi-Fi connection from the voice control device 101, and establish Wi-Fi connection to the external access point specified in S504.

Note that in the above description, the voice control device 101 receives the information necessary for the first registration processing by Wi-Fi. The present invention, however, is not limited to this. For example, the voice control device 101 may enable the Bluetooth function in the mode of executing the first registration processing, and receive the information necessary for the first registration processing by Bluetooth connection to the terminal apparatus 105.

In S506, the voice control device 101 disables its access point, and disconnects the Wi-Fi connection from the terminal apparatus 105. Then, the voice control device 101 is connected to the external access point by Wi-Fi based on the information concerning the external access point received from the terminal apparatus 105. Note that if Wi-Fi connection to the external access point succeeds, the voice control device 101 may make a notification of it by voice.

In S507, the voice control device 101 accesses the voice control device management server 102 via the external access point, and transmits, to the voice control device management server 102, the information concerning the first account received from the terminal apparatus 105 and identification information of itself.

In S508, the voice control device management server 102 manages the voice control device 101 and the first account in linkage with each other based on the received information. Note that the voice control device management server 102 already manages the terminal apparatus 105 and the first account in linkage with each other. Therefore, in S508, the voice control device 101, the terminal apparatus 105, and the first account are linked with each other.

In S509, the terminal apparatus 105 registers a service (skill) to be used with the voice control device 101. In this embodiment, since a print service using the voice control device 101 is used, a print service corresponding to the MFP 104 is registered. Thus, the terminal apparatus 105 transmits, to the voice control device management server 102, information indicating that the user has selected the print service corresponding to the MFP 104.

In S510, the voice control device management server 102 manages the print service corresponding to the MFP 104 and the first account in linkage with each other based on the received information. That is, the print service corresponding to the MFP 104 is registered.

In S511, the terminal apparatus 105 displays a login screen for logging in to a user account (to be referred to as the second account hereinafter) managed by the relay server 103 linked with the print service. The terminal apparatus 105 acquires information for displaying the login screen by, for example, accessing the relay server 103 linked with the print service. Note that a PC or the like that controls the MFP 104 has logged in to the second account, and the relay server 103 manages in advance the second account and the MFP 104 in linkage with each other.

In S512, the terminal apparatus 105 transmits, to the relay server 103, login information (ID, password, and the like) input to the login screen, the information concerning the first account, and information concerning the voice control device management server 102.

In S513, the relay server 103 determines whether the received login information is correct. If, as a result of the determination processing, the received login information is correct, and the login operation to the second account succeeds, the relay server 103 accesses the voice control device management server 102 based on the received information concerning the voice control device management server 102. The relay server 103 transmits, to the voice control device management server 102, an access token for permitting access by the first account and the information concerning the second account.

In S514, the voice control device management server 102 manages the first account and the second account in linkage with each other based on the received information.

This allows the voice control device management server 102 to manage each apparatus and each account in linkage with each other, and recognize specific information to be transmitted to a specific apparatus in notification processing according to this embodiment. Note that in the above description, the processes executed by the terminal apparatus 105 may be executed via, for example, a Web browser or the like provided in the terminal apparatus 105, instead of the voice control application.

In the above description, the authentication operation by the user has been exemplified as a method of associating the voice control device 101 and the MFP 104 with each other. However, another method that can associate the voice control device 101 and the MFP 104 with each other may be used.

A procedure from when the user instructs printing by voice until the MFP 104 associated with the voice control device 101 executes printing will be described below with reference to FIGS. 6 and 7. The user utters "activate a printer" to the microphone 204 of the voice control device 101 in order to call a function for executing printing using the MFP 104 (S601). Utterance contents are registered in advance in the voice control device management server 102 as a keyword (also called an activation phrase or a wake word) to call the function for executing printing using the MFP 104. If the utterance contents are input, the voice control device management server 102 transmits a request to the relay server 103. Note that the activation phrase may be divided into two phrases. That is, after accepting the first activation phrase to shift to a mode of accepting a voice instruction from the user, the voice control device 101 may accept a print service execution instruction of "activate a printer" as the second activation phrase.

The voice control device 101 transmits, to the voice control device management server 102, data of the utterance contents received in S601 (S602). In this transmission processing, voice data corresponding to the received utterance contents may be transmitted intact, or the voice data may be converted into text data in the voice control device 101 and then transmitted as text information of "activate a printer". Then, the voice control device management server 102 requests the relay server 103 as a request destination associated with the received keyword "activate a printer" to call the function for executing printing (S603). More specifically, the voice control device management server 102 analyzes the received voice data. More specifically, the voice control device management server 102 analyzes the voice data corresponding to the second activation phrase, thereby specifying the registered print service, the relay server 103 linked with the print service, and the second account linked with the print service. The relay server 103 linked with the print service is notified of acceptance of the print service execution instruction. Note that the information transmitted at this time includes information indicating the second account linked with the registered print service.

Upon receiving the request, the relay server 103 acquires a list indicating types of printable printed materials (S604). More specifically, the relay server 103 specifies that execution of the print service has been required. Then, the relay server 103 specifies the second account linked with the registered print service, and specifies the MFP 104 to be used to execute the print service. Furthermore, a list of print targets that can be supported by the print service is acquired. The relay server 103 holds the list as fixed values.

FIG. 8 shows an example of a table held in the relay server 103. The table shown in FIG. 8 is held in, for example, the disk device 302. As an item 801 of the table, types of printed materials are listed as print targets. That is, information concerning types of print contents is held. Referring to FIG. 8, as a list of the types of printed materials, "puzzle, coloring picture, writing paper, staff notation, and check list" are listed. Furthermore, as an item 802, an additional setting item is associated with each of the types of printed materials. For example, referring to FIG. 8, "difficulty level" is associated with the type of print content of "puzzle", and "target group" is associated with the type of print content of "coloring picture". In addition, as an item 803, candidates of a settable value are associated as setting contents for each of the additional setting items. For example, referring to FIG. 8, "easy, normal, hard, and random" are associated with the "difficulty level". In FIG. 8, "–" indicates an item in which no setting contents exist. Note that the relay server 103 stores the content data files of a plurality of puzzles according to the setting item "difficulty level" with respect to one type of print content as "puzzle". Therefore, the item 802 in FIG. 8 is a content setting item for narrowing content data to make decision.

The relay server 103 holds, in, for example, the disk device 302, image data for each of the types of printed materials of the item 801 in FIG. 8. In this case, the CPU 301 of the relay server 103 periodically acquires a puzzle from the Internet, and updates the puzzle held in the disk device 302. This can provide a printed material of new contents to the user all the time. When acquiring a puzzle from the Internet, the CPU 301 may also acquire related information concerning an average answer time for the puzzle, and hold it. Note that data of the printed material may be held as static data in the disk device 302 but may be generated dynamically every time printing is executed.

In S604, for example, the CPU 301 acquires content type information of "puzzle, coloring picture, writing paper, staff notation, and check list" as a list of types of printed materials with reference to the table shown in FIG. 8. The information of the table shown in FIG. 8 may be configured to be changed by the user of the relay server 103. For example, the administrator of the relay server 103 may be able to change (edit) the contents of each of the items 801, 802, and 803 of the table shown in FIG. 8 on the UI screen displayed on the display unit 305.

In S604, the CPU 301 may be able to change the information acquired from the table shown in FIG. 8. For example, the above list information may be dynamically changed using attribute information of the sex, interest, and the like of the user and information concerning the paper size supported by the associated MFP 104. For example, if the age of the user is lower than a predetermined age, the information of the table shown in FIG. 8 may be filtered to exclude contents of "puzzle and coloring picture", and then acquired.

Subsequently, the relay server 103 generates message data of a message 1 to be output by voice from the loudspeaker 201 of the voice control device 101 (S605). More specifically, the relay server 103 generates message data for making a notification of a function executable using the MFP 104 in the print service. Contents of the message 1 correspond to an explanation to guide a work that can be done next by the user, and indicate a message that asks the user to select one of the types of printable printed materials acquired in S604 like "You can print puzzle, coloring picture, writing paper, staff notation, and check list by the printer. Which one do you want to print?". Note that in the sequence of FIG. 6, only the voice control device 101 makes a notification. However, the terminal apparatus 105 may make a notification. Alternatively, both the voice control device 101 and the terminal apparatus 105 may make a notification. In this case, the relay server 103 generates message data for the voice control device 101 and that for the terminal apparatus 105. Note that contents of a message to be notified by voice by the voice control device 101 are decided based on the message data for the voice control device 101. That is, the relay server 103 controls the contents of the message to be notified by voice by the voice control device 101. Similarly, contents of a message to be notified on a screen by the terminal apparatus 105 are decided based on the message data for the terminal apparatus 105. That is, the relay server 103 controls the message to be notified on the screen by the terminal apparatus 105 and contents of an illustration.

The relay server 103 transmits the generated message data to the voice control device management server 102 (S606). The voice control device management server 102 converts the received message data into voice message data for making a notification of the message 1 by voice, and transmits the voice message data to the voice control device 101 (S607). Based on the received voice message data, the voice control device 101 reproduces the message 1 to the user by outputting the message 1 by voice from the loudspeaker 201 (S608). That is, a message of "You can print puzzle, coloring picture, writing paper, staff notation, and check list by the printer. Which one do you want to print?" is output by voice. Note that if the terminal apparatus 105 executes a notification, the voice control device management server 102 converts the received message data into data in a displayable data format, and transmits the converted data to the terminal apparatus 105. Then, the terminal apparatus 105 executes display of the message based on the received data.

Subsequently, the user selects one of the types of printable printed materials presented by the message 1 reproduced in S608. A description will be provided below with reference to FIG. 7. In S701 of FIG. 7, the user utters "print OO" as a selection operation. "OO" indicates one of the types of printable printed materials presented in the message 1, and the user utters, for example, "print a puzzle". The voice control device 101 transmits the utterance contents received in S701 to the voice control device management server 102 (S702). A transmission method may be voice data or text data, similar to S602. Then, the voice control device management server 102 requests the relay server 103 to call the function for executing printing of "OO" (S703).

Upon receiving the request, the relay server 103 determines whether there is an additional setting for the designated type of printed material (type of print content) (S704). That is, it is determined whether further specification is necessary to decide content data. This determination processing is performed by, for example, holding the table shown in FIG. 8 in the disk device 302 of the relay server 103, and confirming the presence/absence of an additional content setting item for the designated type of print content. If it is determined that there is an additional setting, message data of a message 2 representing contents to be output by voice to the user by the voice control device 101 is generated (S705). Note that if it is determined in S704 that it is possible to decide content data (there is no content setting item), the process advances to S712.

Contents of the message 2 correspond to an explanation of guidance of a work that can be done next by the user, and are contents to present an additional setting item to be set by the user. For example, if "puzzle" is designated as a print target, there is "difficulty level" as an additional setting item in FIG. 8, and there are four settable values of "easy, normal, hard, and random". In this case, as contents of the message 2, message data of "select the difficulty level of the puzzle from easy, normal, hard, and random" is generated.

The relay server 103 transmits the generated message 2 to the voice control device management server 102 (S706). The voice control device management server 102 converts the received message data into voice message data to be notified by voice, and transmits the voice message data to the voice control device 101 (S707). The voice control device 101 reproduces the message 2 to the user by outputting the message 2 by voice from the loudspeaker 201 based on the received voice message data (S708).

Subsequently, the user selects one of the settable values for the additional setting item presented by the message 2 reproduced in S708, and utters an additional setting in S709. If the voice control device 101 outputs, by voice, the above-described message 2 concerning the difficulty level of the puzzle, the user utters, for example, "hard" in S709. The voice control device 101 transmits the utterance contents received in S709 to the voice control device management server 102 (S710). A transmission method may be voice data or text data, similar to S602. Then, the voice control device management server 102 requests the relay server 103 to call the function for executing printing with the additional setting (S711).

Upon receiving the request, the relay server 103 confirms whether all the pieces of information concerning the content setting items for deciding content data have been set. More specifically, to determine whether further specification is necessary to decide content data, similar to S704, the relay server 103 which has received the request confirms the presence/absence of an additional content setting item. If it is determined that there is a further setting item, a step of confirming content setting item information for deciding content data is repeated, similar to S705 to S711.

If all the pieces of necessary information concerning the content setting items have been set, message data to confirm, with the user, the number of copies as a print setting item is generated, and transmitted to the voice control device management server 102 (S712). Message contents indicate, for example, a message of "how many copies do you want to print?". The voice control device management server 102 converts the received message data into voice message data, and transmits it to the voice control device 101 (S713). The voice control device 101 prompts the user to confirm the number of copies by outputting, based on the received voice message data, the message of confirming the number of copies by voice from the loudspeaker 201 (S714).

The user utters the number of copies to be printed, like "two" (S715). The voice control device 101 transmits the utterance contents received in S715 to the voice control device management server 102 (S716). A transmission method may be voice data or text data, similar to S602. Then, the voice control device management server 102 requests the relay server 103 to call the function for executing printing with the designated number of copies (S717). Upon receiving the request, the relay server 103 generates print data based on the pieces of information of "type of print content" (for example, "puzzle"), "additional setting value for deciding content data" (for example, "hard"), and "number of copies" (for example, "two"), all of which have been acquired by the above series of interactions (S718). That is, based on the decided content data, the relay server 103 generates print data of the designated number of copies. Then, the relay server 103 instructs the MFP 104 to execute printing using the generated print data (S719). Note that in the sequence of FIG. 7, predetermined setting values are set for print setting items (for example, paper size, paper type, and the like) except for the number of copies. When generating print data, the predetermined setting values are applied.

Note that if the user utters "two", the process advances up to execution of printing in S719. However, after S717, the relay server 103 may generate confirmation message data of "are you sure you want to print two copies of puzzle with the difficulty level of hard?", and transmit it to the voice control device 101 via the voice control device management server 102. In this case, the above confirmation message is output by voice from the loudspeaker 201 of the voice control device 101. If the user utters "yes", the voice control device 101 outputs a message of "printing is started, and we look forward to serving you again" by voice from the loudspeaker 201. Then, the voice control device 101 transmits the utterance contents of "yes" to the voice control device management server 102, similar to S716. Furthermore, similar to S717, the utterance contents of "yes" are transmitted to the relay server 103, and then the processes in S718 and S719 are performed. In the above-described example, if the user utters "no", the processes from S714 may be repeated.

If a plurality of copies of print data are printed with the number of copies designated by the user, whether to print a plurality of copies of the same print data or to print different print data may be switched in accordance with the type of print data. For example, if the user designates to print two copies of a puzzle, print data to print one copy of each of different puzzles is generated. However, if the user designates to print two copies of a coloring picture, print data to print two copies of the same coloring picture is generated. Information of whether to print a plurality of copies of the same print data or to print a plurality of different print data when a plurality of copies are designated may be set for each type of the item 801 of the table shown in FIG. 8. The user may be able to arbitrarily change such setting.

The additional setting table shown in FIG. 8 is an example in which there is only one additional setting item for specifying content data. However, there may be a plurality of additional setting items. FIG. 9 is a table showing an example of a table in which there are a plurality of additional setting items. An item 901 of FIG. 9 corresponds to the item 801 of FIG. 8. FIG. 9 is different from FIG. 8 in that additional setting items have a hierarchical relationship, like items 902 and 904. That is, if the user inputs "puzzle" by voice to the microphone 204, the relay server 103 generates, for example, message data of "select the type of puzzle from number place and crossword". If the user inputs, for example, "crossword" by voice to the microphone 204, the relay server 103 generates, for example, message data of "select genre from economy, culture, and entertainment". If the user inputs, for example, "culture" by voice to the microphone 204, the relay server 103 generates a message of confirming the number of copies, similar to S712.

That is, if, after receiving the additional setting contents in S711, the relay server 103 determines, with reference to FIG. 9, that there is a further additional setting item, the processes in S705 to S711 are performed again. In this embodiment, setting information for deciding content data is acquired by continuously interacting with the user until setting of all the additional setting items is completed. Note that the table of FIG. 9 may also be configured to be changed (edited) by the user, similar to FIG. 8. For example, the user may be able to increase/decrease the additional setting items.

As described above, according to this embodiment, if, based on the type of content designated in S701, there is an additional setting item necessary to decide content data, the voice control device 101 is caused to output the additional setting item by voice. When the user hears the output, he/she continuously utters a desired item to input it by voice by the voice control device 101. Furthermore, if content data is uniquely decided based on the type of content designated in S701, the voice control device 101 is caused to output the number of copies by voice without executing S705 to S711. With this arrangement, even if the settings have the hierarchical arrangement, the user need not operate a setting screen, thereby improving the usability.

(Modification)

A modification of this embodiment will be described below. In FIG. 7, in the procedure from a print instruction by the user to execution of printing, to generate print data, interaction with the user is done every time each additional setting item or the number of copies is set. For example, if one copy of a puzzle with a difficulty level of "easy" as the additional setting item is printed, the message of "You can print puzzle, coloring picture, writing paper, staff notation, and check list by the printer. Which one do you want to print?" is output in response to "activate a printer" uttered by the user. Furthermore, the message of "select the difficulty level of the puzzle from easy, normal, hard, and random" is output in response to "print a puzzle" uttered by the user. In addition, the message of "how many copies do you want to print?" is output in response to "easy" uttered by the user. Finally, print data is generated based on "one" uttered by the user as the print setting item (the setting item except for the additional setting items defined in FIGS. 8 and 9), for example, the "number of copies".

By integrating the series of interactions into one or a plurality of interactions (one-shot utterance mode), the number of interactions for specifying print data may be reduced. For example, the CPU 202 or 301 extracts words from a voice signal by voice recognition, and determines whether the voice instruction by the user includes information that enables generation of print data. In the above example, since, with respect to "activate a printer, and print one copy of puzzle with the difficulty level of easy" uttered by the user, words "difficulty level of easy", "puzzle", "one", and "print" are extracted, it is determined that it is possible to generate print data. In this case, the relay server 103 can generate print data, and the MFP 104 can execute printing. With respect to "activate a printer, and print a puzzle with the difficulty level of easy" uttered by the user, words "difficulty level of easy", "puzzle", and "print" are extracted. In this case, the CPU 202 or 301 can decide content data but recognizes that the setting item of "number of copies" lacks, and thus determines that it is impossible to generate print data. Then, to only confirm the number of copies, message data of "how many copies do you want to print?" is generated by the relay server 103, and output by voice from the loudspeaker 201 of the voice control device 101. If, based on the voice output, the user utters "one", the relay server 103 can generate print data based on the utterance, and the MFP 104 executes printing.

Figure 6:
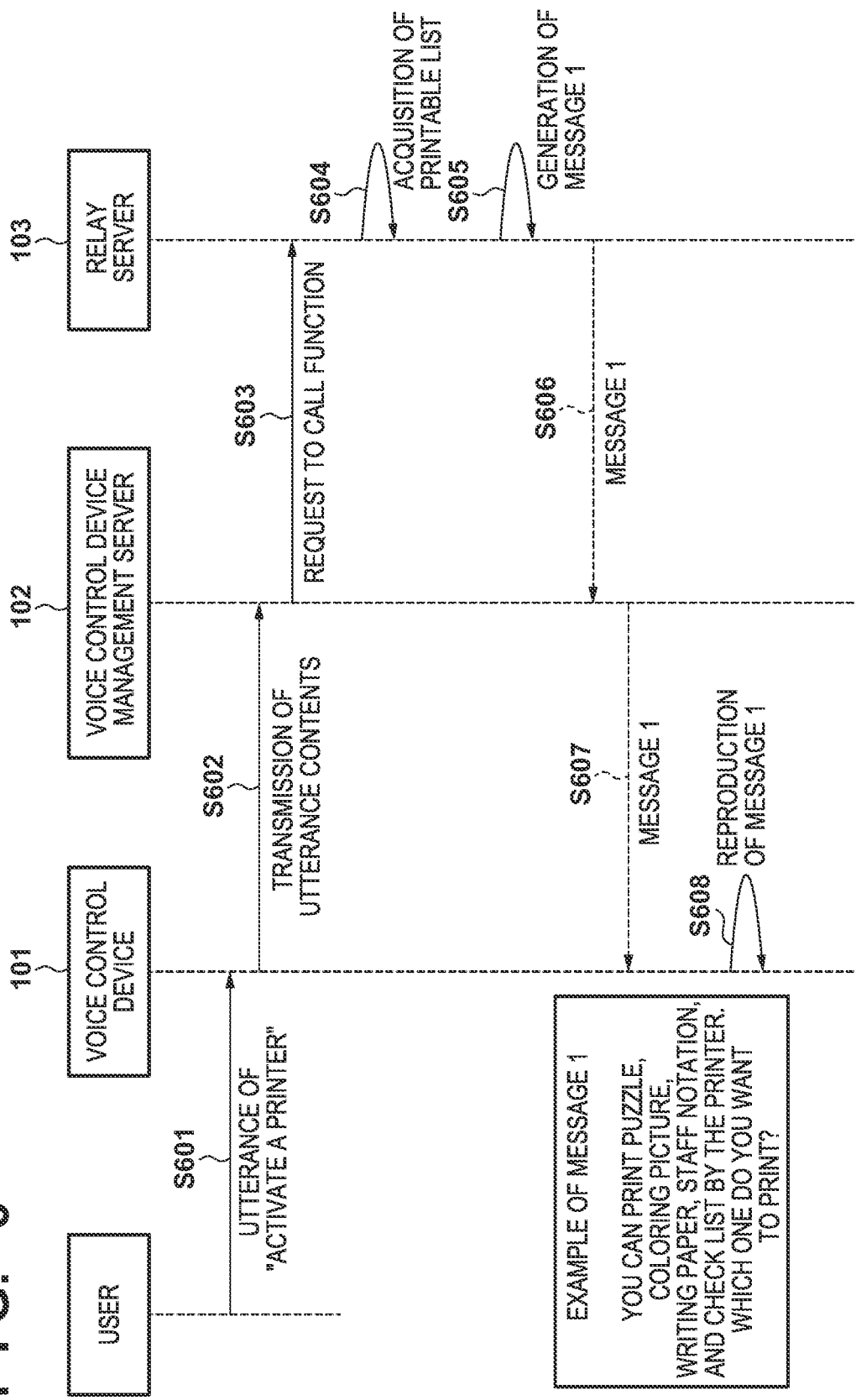
FIG. 6 is a sequence chart showing processing of activating the printing system.
Figure 7:
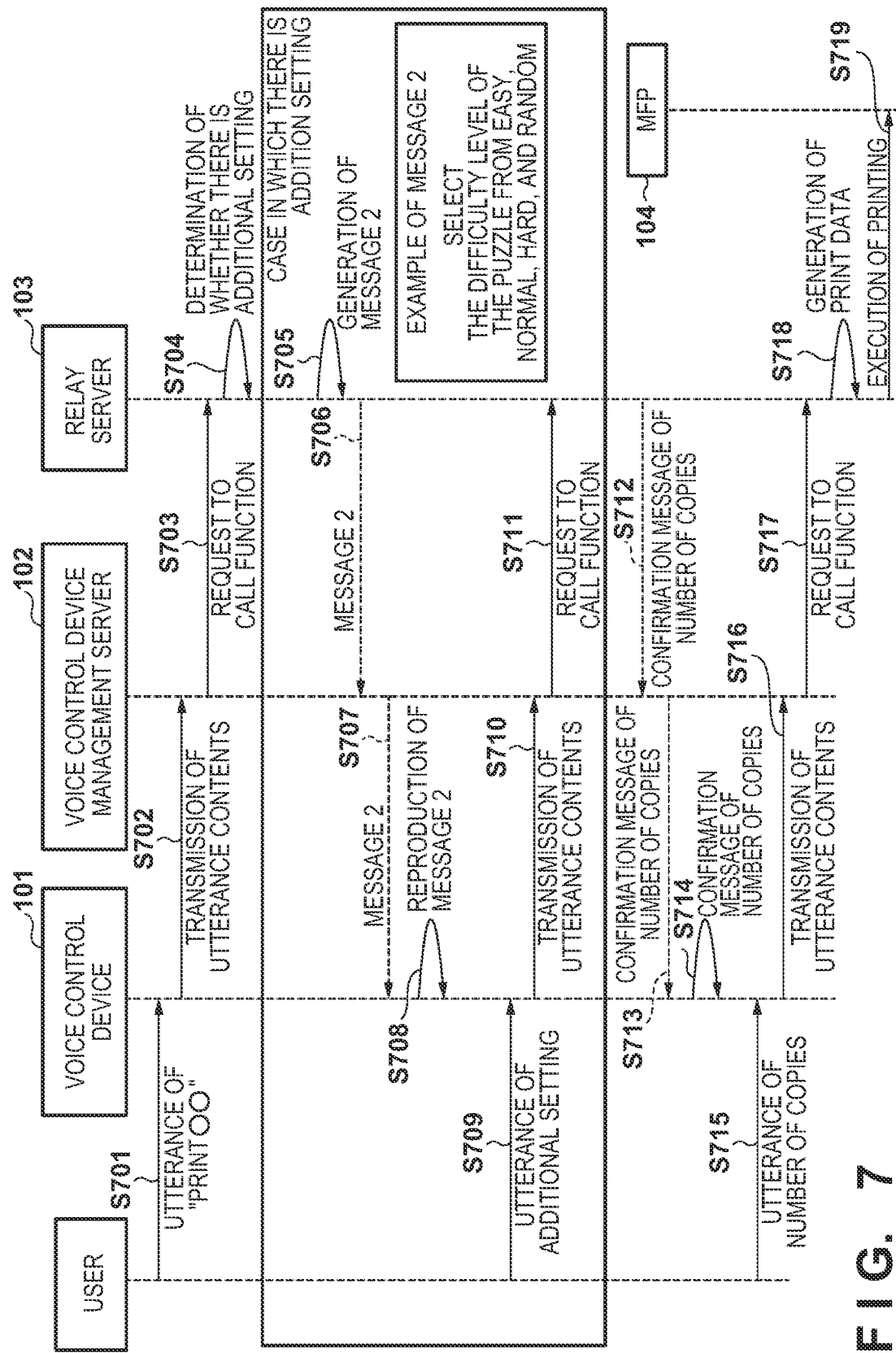
FIG. 7 is a sequence chart showing processing from a print instruction by a user to execution of printing.

The one-shot utterance mode may be executed when utterance by the user in response to the voice output of the message 1 shown in FIG. 6 includes an additional word in addition to utterance words expected for the message 1, such as "difficulty level of easy", "puzzle", "one", and "print". On the other hand, if only the utterance words expected for the message 1 are included, like "print a puzzle", the processes shown in FIG. 7 are sequentially executed.

With respect to information concerning the number of copies and other settings, for example, the relay server 103 stores past setting information as a history. If no number of copies is designated, the number of interactions may be reduced using the number of copies at the time of previous printing. At this time, previous setting information is stored for, for example, each type of printed material, and the default number of copies may be switched in accordance with the designated type of printed material. For example, in the one-shot utterance mode, if the user utters "activate a printer, and print a puzzle with the difficulty level of easy", words of "difficulty level of easy", "puzzle", and "print" are extracted by voice recognition. Even though a word for the number of copies is not extracted, confirmation message data of "are you sure you want to print three copies of puzzle with the difficulty level of easy?" may be generated using the number of copies at the time of previous printing, or the default number of copies. If the user utters "yes" to the message, the voice control device 101 outputs "printing is started, and we look forward to serving you again" by voice from the loudspeaker 201. On the other hand, if the user utters "no", for example, the message 1 shown in FIG. 6 may be output again by voice.

In the above-described example, after specifying content data, the number of copies is confirmed as the print setting item in S712 to S717. This embodiment, however, is not limited to this. That is, a print setting item other than the number of copies may be confirmed. For example, one of a paper size, paper type, color setting (color or monochrome), and print layout (page allocation) may be confirmed as a print setting item. Print setting items to be confirmed and the number of print setting items to be confirmed may be different in accordance with the specified content data. For example, the paper size and the number of copies may be confirmed for a coloring picture, and only the number of copies may be confirmed for a puzzle.

If the user accepts a predetermined voice command corresponding to the type of printed material, a specific operation may be executed. For example, if a voice signal representing that a printed puzzle has been solved, like "puzzle can be done", is accepted via the microphone 204 after the user prints the puzzle, the voice control device 101 may transmit, to the voice control device management server 102, utterance contents to print another new puzzle. The voice control device management server 102 transmits the utterance contents to the relay server 103, and the relay server 103 controls the MFP 104 to print another new puzzle. At this time, the relay server 103 stores time when the user prints the puzzle. If an elapsed time is shorter than an average answer time corresponding to the difficulty level of the puzzle, that is, if it is determined that the user has easily solved the puzzle, printing such as printing of a puzzle with a higher difficulty level may be automatically executed by changing the setting contents in accordance with the situation.

During interaction by voice, the user may need guidance for utterance to be made or a function of the system. In this case, when the user utters a keyword such as "help" to request guidance, a message to guide the user may be output by voice in accordance with the current interaction state.

For example, if the user utters "help" to a voice output "You can print puzzle, coloring picture, writing paper, staff notation, and check list by the printer. Which one do you want to print?", the relay server 103 may generate message data to give a more detailed explanation like "There are puzzles with various difficulty levels and coloring pictures for adults and children. Select one of puzzle, coloring picture, writing paper, staff notation, and check list to print", and the voice control device 101 may output the message data by voice. If the user utters "help" in response to a voice output "select the difficulty level of the puzzle from easy, normal, hard, and random", message data of "you can select the difficulty level of the puzzle to challenge" is output. Furthermore, if the user utters "tell me challenge achievements of puzzles", the relay server 103 may generate a guidance message to introduce another function in addition to the more detailed explanation like "You can confirm the number of challenges of puzzles until now. Select one of easy, normal, and hard", and the voice control device 101 may output the guidance message by voice.

The relay server 103 holds format data of a message in, for example, the disk device 302. For example, the CPU 301 generates the above-described various messages by editing the format data (for example, combining the extracted words and the format data) in accordance with the words extracted using the voice recognition function.

In response to utterance by the user, a message may be transmitted as text data to the user terminal, as needed, in addition to a voice output. More specifically, the voice control device management server 102 preferably transmits display data to the terminal apparatus 105 which has executed the registration processing in FIG. 5. For example, when the above-described message to introduce another function is displayed as text data, the user understands more easily than the case in which the user is notified of the message by voice. For example, after executing printing, the message may be displayed as text on the terminal apparatus 105, as indicated by a message 1000 shown in FIG. 10A. Note that the message output by voice by the voice control device 101 may be different from the message displayed on the terminal apparatus 105. As the message is longer, the probability that the user misses the message is higher. However, as shown in FIG. 10A, if the message is displayed as text data on the user terminal, the user can reliably be notified of the contents of the message. Therefore, the message output by voice by the voice control device 101 includes simple contents, and the message displayed on the terminal apparatus 105 displays detailed contents. With respect to a portion, for introducing another function, of the message 1000 shown in FIG. 10A, display contents may be randomly switched for each print operation. For example, in FIG. 10A, a function (for example, one-shot utterance mode) capable of executing printing more easily is introduced. The introduction of the one-shot utterance function is displayed after executing printing in accordance with the sequence shown in FIG. 7. A message to introduce another function, like "if puzzle is solved, say "solved" to print harder puzzle", may be displayed.

Figure 10B:
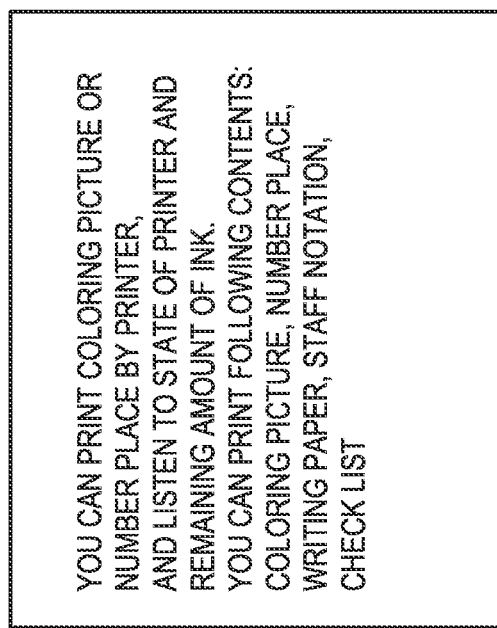
FIGS. 10A and 10B are views each showing a message displayed on a user terminal.
Figure 10A:
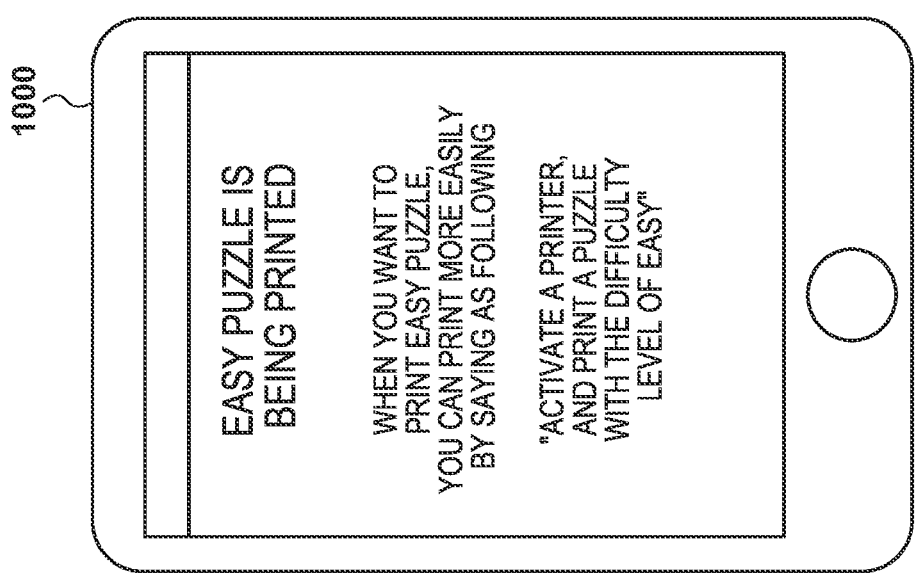

If, for example, the user utters "activate a printer" in S601 of FIG. 6, the message 1 is output by voice in S608, while information associated with the message 1 and partially different from the message 1 may be displayed as text data to the user, as shown in FIG. 10B. For example, a main message is output by voice, and additional information like "you can listen to the remaining amount of ink" is auxiliarily also displayed as text data to the user. This can prevent the user from missing the message output by voice since it is long.

As a method of displaying the text data, there are provided a method of transmitting a text message onto a local application installed in the user terminal, and a method of transmitting text to the user using a function such as a mail function. Furthermore, if the above-described guidance contents when the user utters "help", and information concerning the number of copies printed and the like are provided to the user by outputting them by voice, they may also be presented as text data to the user on the user terminal. Although the text data has been explained as display data to be displayed on the user terminal, image data representing an image or a combination of the text data and the image data may be possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-114690, filed Jun. 15, 2018, which is hereby incorporated by reference herein in its entirety.

What is claimed is:

1. A printing system comprising:
a server system comprising at least one processor that causes the server system to receive instruction data based on a voice instruction accepted by a voice control device, and
transmit message data based on the received instruction data; and
a printing apparatus that communicates with the server system,
wherein the voice control device outputs a message by voice based on the transmitted message data,
wherein in a case where the instruction data includes information indicating inquiry related to a status of the printing apparatus, the server system transmits the message data for answering with respect to the status of the printing apparatus, and
in a case where the instruction data includes information indicating a first content type to be printed, the server system transmits message data for narrowing down a content to be printed, and in a case where the instruction data includes information indicating a second content type to be printed and different from the first content type, the server system does not transmit message data for narrowing down a content to be printed,
the voice control device outputs, in a case where the message data for narrowing down the content to be printed is transmitted, a message by voice based on the transmitted message data and accepts a voice instruction related to a content of the first content type,
the server system specifies content data of the first content type based on instruction data received in a case where the voice instruction related to the content of the first content type is accepted, and
the printing apparatus executes printing based on print data generated based on the specified content data of the first content type.

2. The system according to claim 1, wherein in a case where the instruction data includes the information indicating the first content type to be printed, the server system transmits message data for narrowing down the content to be printed, and in a case where the instruction data includes the information indicating the second content type to be printed, the server system transmits message data for inquiring about a print setting item.

3. The system according to claim 2, wherein the server system stores a plurality of content data files as the first content type to be printed, and stores only one content data file as the second content type to be printed.

4. The system according to claim 2, wherein after the voice control device outputs the message by voice based on the transmitted message data for narrowing down the content to be printed, information concerning a content setting item is acquired, and after the information concerning the content setting item is acquired, the server system transmits message data for inquiring about a print setting item.

5. The system according to claim 4, wherein in a case where the content data is specified and information concerning the print setting item is acquired, the print data is generated.

6. The system according to claim 4, wherein a predetermined setting value is applied to an item, among print setting items, for which no inquiry is made.

7. The system according to claim 4, wherein a setting value used in previous printing is applied to the print setting item.

8. The system according to claim 4, wherein the print setting item is the number of copies.

9. The system according to claim 4, further comprising a storage unit configured to store the content setting item.

10. The system according to claim 9, wherein the storage unit stores a type of content and a content setting item in association with each other.

11. The system according to claim 10, wherein in a case where there are provided a plurality of content setting items for one type of content, the plurality of content setting items have a hierarchical relationship.

12. The system according to claim 4, wherein in a case where a user instructs a plurality of copies based on transmission of the message data for inquiring about the number of copies as the print setting item, whether to print the plurality of copies of same content data or to print different content data is changed in accordance with a type of content.

13. The system according to claim 4, wherein the print data is generated based on the specified content data and information concerning the print setting item.

14. The system according to claim 1, wherein in a case where the voice instruction is a command to request guidance, message data concerning the requested guidance is transmitted.

15. The system according to claim 1, wherein the voice control device is registered in association with an account.

16. The system according to claim 15, wherein the server system is further configured to transmit display data to be displayed on a terminal apparatus associated with the voice control device via the account.

17. The system according to claim 16, wherein the display data includes information at least partially different from the transmitted message data.

18. A voice control printing system comprising:
a voice control device that accepts a voice instruction from a user;
a server system comprising at least one processor that causes the server system to
receive instruction data based on the voice instruction accepted by the voice control device, and
transmit message data based on the received instruction data; and
a printing apparatus that communicates with the server system,
wherein the voice control device outputs a message by voice based on the transmitted message data,
wherein in a case where the instruction data includes information indicating inquiry related to a status of the printing apparatus, the server system transmits the message data for answering with respect to the status of the printing apparatus, and
in a case where the instruction data includes information indicating a first content type to be printed, the server system transmits message data for narrowing down a content to be printed, and in a case where the instruction data includes information indicating a second content type to be printed and different from the first content type, the server system does not transmit message data for narrowing down a content to be printed,
the voice control device outputs, in a case where the message data for narrowing down the content to be printed is transmitted, a message by voice based on the transmitted message data and accepts a voice instruction related to a content of the first content type,
the server system specifies content data of the first content type based on instruction data received in a case where the voice instruction related to the content of the first content type is accepted, and
the printing apparatus executes printing based on print data generated based on the specified content data of the first content type.

19. The system according to claim 18, wherein in a case where the instruction data includes the information indicating the first content type to be printed, the server system transmits message data for narrowing down the content to be printed, and in a case where the instruction data includes the information indicating the second content type to be printed, the server system transmits message data for inquiring about a print setting item.

20. The system according to claim 19, wherein the server system stores a plurality of content data files as the first content type to be printed, and stores only one content data file as the second content type to be printed.

21. The system according to claim 19, wherein after the voice control device outputs the message by voice based on the transmitted message data for narrowing down the content to be printed, information concerning a content setting item is acquired, and after the information concerning the content setting item is acquired, the server system transmits message data for inquiring about a print setting item.

22. The system according to claim 21, wherein in a case where the content data is specified and information concerning the print setting item is acquired, the print data is generated.

23. The system according to claim 22, wherein a predetermined setting value is applied to an item, among print setting items, for which no inquiry is made.

24. The system according to claim 21, wherein a setting value used in previous printing is applied to the print setting item.

25. The system according to claim 21, wherein the print setting item is the number of copies.

26. The system according to claim 21, further comprising a storage unit configured to store the content setting item.

27. The system according to claim 26, wherein the storage unit stores a type of content and a content setting item in association with each other.

28. The system according to claim 27, wherein in a case where there are provided a plurality of content setting items for one type of content, the plurality of content setting items have a hierarchical relationship.

29. The system according to claim 21, wherein in a case where a user instructs a plurality of copies based on transmission of the message data for inquiring about the number of copies as the print setting item, whether to print the plurality of copies of same content data or to print different content data is changed in accordance with a type of content.

30. The system according to claim 21, wherein the print data is generated based on the specified content data and information concerning the print setting item.

31. The system according to claim 18, wherein in a case where the voice instruction is a command to request guidance, message data concerning the requested guidance is transmitted.

32. The system according to claim 18, wherein the voice control device is registered in association with an account.

33. The system according to claim 32, wherein the server system is further configured to transmit display data to be displayed on a terminal apparatus associated with the voice control device via the account.

34. The system according to claim 33, wherein the display data includes information at least partially different from the transmitted message data.

* * * * *